US009636774B2

(12) United States Patent
Mochida (10) Patent No.: US 9,636,774 B2
(45) Date of Patent: May 2, 2017

(54) CONTROLLER FOR LASER BEAM MACHINING FOR CONTROLLING APPROACHING OPERATION OF MACHINING HEAD

(75) Inventor: Takeshi Mochida, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 1017 days.

(21) Appl. No.: 13/592,482

(22) Filed: Aug. 23, 2012

(65) Prior Publication Data

US 2013/0103183 A1 Apr. 25, 2013

(30) Foreign Application Priority Data

Oct. 21, 2011 (JP) .................................. 2011-232103

(51) Int. Cl.
*G05B 19/19* (2006.01)
*B23K 26/04* (2014.01)

(52) U.S. Cl.
CPC ............ *B23K 26/048* (2013.01); *G05B 19/19* (2013.01); *G05B 2219/37425* (2013.01); *G05B 2219/41029* (2013.01); *G05B 2219/45165* (2013.01)

(58) Field of Classification Search
USPC ......................................................... 700/186
See application file for complete search history.

(56) References Cited

U.S. PATENT DOCUMENTS 7,012,215 B2 * 3/2006 Mori ...................... B23K 26/06
219/121.61
2003/0183608 A1 * 10/2003 Yamazaki .......... B23K 26/0853
219/121.83

FOREIGN PATENT DOCUMENTS

| JP | 9-308979 | 12/1997 |
| JP | 2006-122939 | 5/2006 |
| JP | 2010-125518 | 6/2010 |

* cited by examiner

*Primary Examiner* — Carlos Ortiz Rodriguez
(74) *Attorney, Agent, or Firm* — Drinker Biddle & Reath LLP (57) ABSTRACT

A controller used for irradiating a laser beam to an object from a machining head at a reference gap position is provided. The controller includes a gap sensor for detecting an amount of gap between the machining head and the object, a gap position command calculation part for producing a gap position command, a servo mechanism for driving the machining head to the reference gap position, a servo position deviation reading part for reading an amount of position deviation of the servo mechanism, a position gain calculation part for calculating a corrected position gain of the servo mechanism, based on the amount of position deviation of the servo mechanism and a position gain replacing part for replacing the position gain of the servo mechanism with the corrected position gain.

4 Claims, 5 Drawing Sheets

CONTROLLER FOR LASER BEAM MACHINING FOR CONTROLLING APPROACHING OPERATION OF MACHINING HEAD

RELATED APPLICATION DATA

This application claims priority under 35 U.S.C. §119 and/or §365 to Japanese Application No. 2011-232103 filed Oct. 21, 2011, the entire contents of which are incorporated herein by reference.

BACKGROUND OF THE INVENTION

1. Field of the Invention

This invention relates to a controller for laser beam machining for controlling an approaching operation of a machining head.

2. Description of the Related Art

There have been known controllers for laser beam machining for controlling an approaching operation of a machining head by detecting an amount of gap (length of the gap) between the machining head and an object to be machined, and calculating a distance to a reference gap position suitable for the laser beam machining (See JP 9-308979 A and JP 2006-122939 A.).

There is a need to provide a controller for laser beam machining capable of preventing overshoot, i.e., preventing the machining head from being driven beyond the reference gap position which is a target position.

OUTLINE OF THE INVENTION

According to a first aspect of the present invention, a controller for laser beam machining for machining an object by irradiating a laser beam thereto from a machining head at a reference gap position situated at a predetermined distance away from the object is provided, the controller comprising: a gap sensor for detecting an amount of gap between the machining head and the object; a gap position command calculation part for producing a gap position command in cooperation with the gap sensor; a servo mechanism part for driving the machining head to the reference gap position based on the gap position command; a servo position deviation reading part for reading an amount of position deviation of the servo mechanism part; a position gain calculation part for calculating a corrected position gain of the servo mechanism part, based on the amount of position deviation of the servo mechanism part; and a position gain replacing part for replacing the position gain of the servo mechanism part with the corrected position gain calculated by the position gain calculating part.

According to a second aspect of the invention, in the controller for laser beam machining of the first aspect, the position gain calculation part calculates a theoretical amount of position deviation based on the position gain and an approaching velocity of the machining head, and calculates the corrected position gain based on the theoretical amount of position deviation and on the amount of position deviation of the servo mechanism part read by the servo position deviation reading part.

According to a third aspect of the invention, in the controller for laser beam machining of the first or second aspect, the position gain calculation part calculates a modified value of the corrected position gain by modifying the corrected position gain based on the amount of gap detected by the gap sensor.

According to a fourth aspect of the invention, in the controller for laser beam machining of any one of the first to third aspects, the controller further comprises a position gain modifying part for modifying the corrected position gain based on an amount of changes in the position gain upon replacement by the position gain replacing part.

According to a fifth aspect of the invention, in the controller for laser beam machining of any one of the first to fourth aspects, the controller further comprises a clamp part for clamping the corrected position gain to a predetermined value if the corrected position gain exceeds the predetermined value in comparison of the corrected position gain with the predetermined value.

These and other objects, features and advantages of the present invention will become more apparent in light of the detailed description of exemplary embodiments thereof as illustrated in the accompanying drawings.

DETAILED DESCRIPTION

Figure 1:
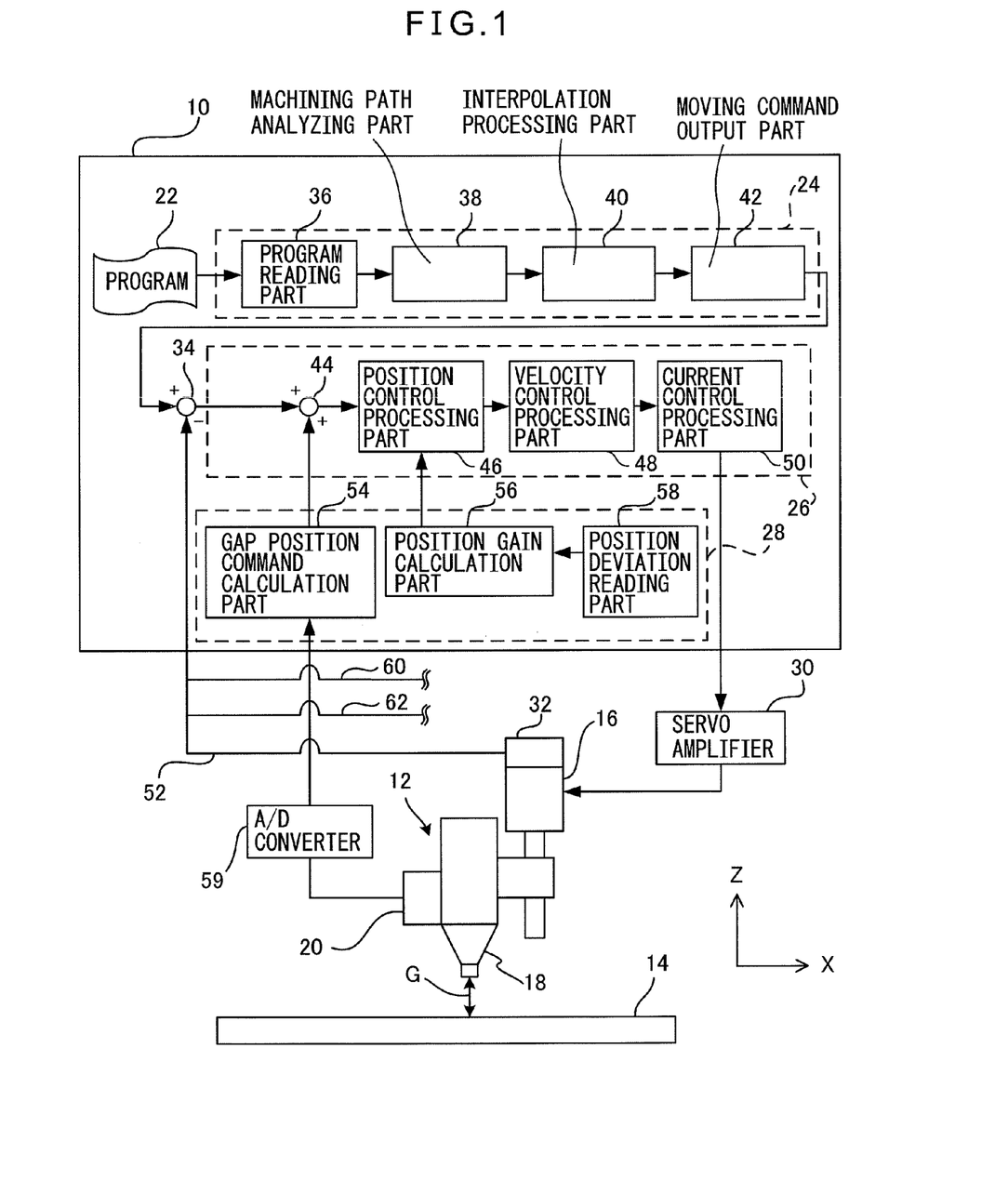
FIG. 1 is a schematic block diagram illustrating a configuration of a controller for laser beam machining according to an embodiment of the invention.

First, with reference to FIG. 1, a configuration of a controller 10 according to an embodiment of the invention will be described. FIG. 1 is a schematic block diagram illustrating the configuration of the controller 10 for laser beam machining according to the embodiment of the invention.

The controller 10 is a numerically controlled (NC) device for controlling rotation of a servo motor, which will be described below, in response to a position command and a velocity command to execute a given machining program. The controller 10 is used for positioning a laser beam machining device (in particular, a machining head 12) at a certain position relative to a workpiece (an object to be machined) 14. The laser beam machining device irradiates a laser beam from the machining head 12 in order to perform on the workpiece 14 a variety of laser beam machining processes such as cutting, perforation, welding, surface treatment and fine machining. The workpiece 14 may be any kind of parts made of metal such as stainless steel, aluminum or iron, or of ceramics, plastics or any composite materials.

Drive control of the machining head 12 is performed independently in an X-axis direction extending in parallel to the surface of the workpiece 14, in a Y-axis direction extending in a thickness direction of a plane of FIG. 1 and in a Z-axis direction at right angle in relation to the surface of the workpiece 14, respectively. For the purpose of simplification of the drawing, FIG. 1 only shows a servo motor 16 for driving the machining head 12 in the Z-axis direction, and servo motors for driving the machining head 12 in the X-axis and Y-axis directions are omitted. Instead of providing the servo motors for driving the machining head 12 in the X-axis and Y-axis directions to the machining head 12, it is also possible to provide servo motors to a jig or a table for holding the workpiece 14, for example. In this case, the drive control of the workpiece 14 is performed relative to the machining head 12 in the X-axis and Y-axis directions, respectively. The servo motor 16 is equipped with a scale 32 for obtaining data on positions of the servo motor 16 in the Z-axis direction based on a rotation angle of the servo motor 16. The obtained data on positions of the servo motor 16 in the Z-axis direction is fed back as a feedback signal 52 to a subtractor 34 of the controller 10.

A gap sensor 20 is provided in the vicinity of a nozzle 18 of the machining head 12 for measuring an amount of gap G corresponding to the length of gap between the nozzle 18 and the surface of the workpiece 14 in the Z-axis direction. With the aid of the gap sensor 20, the nozzle 18 of the machining head 12 can be positioned at a suitable distance away from the surface of the workpiece 14 for the laser beam machining (This position is hereinafter referred to as a "reference gap position."). In a state where the machining head 12 is situated at the reference gap position, laser beam machining is performed by irradiating a laser beam from the nozzle 18. The nozzle 18 is controlled in relation to the gap, so as to maintain the reference gap position until a series of laser beam machining is completed. Namely, in the case where the surface of the workpiece 14 is curved or rough, the laser beam machining is conducted, while the nozzle 18 of the machining head 12 is positioned in position in the Z-axis direction.

The controller 10 according to the embodiment of the invention will be now more specifically described. The controller 10 includes a moving amount calculation part 24 for calculating a moving amount of the machining head 12 and producing a moving command including a position command and a velocity command in the X-axis and Y-axis directions, in order to execute a given machining program 22. In addition, the controller 10 includes a servo control part 26 for producing a control signal to a servo amplifier 30, based on a position command and a velocity command in the Z-axis direction produced by a gap position command calculation part 54, which will be described below. The controller 10 further includes a gap control part 28 for controlling the gap upon receipt of an amount of gap and modifying a position gain of the servo motor 16.

A process at the moving amount calculation part 24 is now described. The moving amount calculation part 24 includes a program reading part 36, a machining path analyzing part 38, an interpolation processing part 40 and a moving command output part 42. The moving amount calculation part 24 functions to produce a moving command in the X-axis and Y-axis directions, which are necessary for executing the laser beam machining specified by the machining program 22.

First, the program reading part 36 reads the machining program 22 that has been input by a user. The machining program 22 is a program that contains data necessary for controlling the laser beam machining apparatus to machine the workpiece 14 as necessary. For example, when perforations are formed in a metal plate, the program may include data related to a thickness of the metal plate, diameters of the perforations and positions of the perforations. The machining path analyzing part 38 analyzes a machining path in the machining program 22, and obtains positions data and feeding velocity in the X-axis and Y-axis directions to execute the machining processing. Signals produced by the machining path analyzing part 38 are interpolated in the interpolation processing part 40. The interpolated command signals related to the moving command are sent to the moving command output part 42 and moving commands in the X-axis and Y-axis directions are output as positive signals from the moving command output part 42 to the subtractor 34. A moving command in the Z-axis direction output from the moving command output part 42 is zero. The subtractor 34 receives feedback signals 60 and 62 as negative signals. The feedback signal 60 represents detected position data of a servo motor (not shown) in the X-axis direction and the feedback signal 62 represents detected position data of a servo motor (not shown) in the Y-axis direction. Therefore, the subtractor 34 calculates an amount of position deviation which is a difference between the position commands and actual positions of the servo motors in the X-axis and Y-axis directions, respectively. The subtractor 34 also receives a feedback signal 52 which represents position data in the Z-axis direction. This, however, will be further described below.

The servo control part 26 includes an adder 44, a position control processing part 46, a velocity control processing part 48 and a current control processing part 50. The servo control part 26 provides the servo amplifier 30 with control signals necessary for controlling each of servo motors associated with the X-axis, Y-axis and Z-axis directions, respectively. A manner of controlling the servo motors in the X-axis and Y-axis directions will be described first. The X-axis direction and the Y-axis direction in relation to the present invention can be merely relatively defined, and thus there is no need to explain them separately. Therefore, the following description will be directed to the X-axis direction only. It is, however, obvious to a person skilled in the art that the same also applies to the Y-axis direction. As described above, the subtractor 34 calculates the amount of position deviation, i.e., a difference between the position command and the detected position in the X-axis direction. The amount of position deviation is used by the position control processing part 46 to calculate the velocity command. A signal input from the gap position command calculation part 54 to the adder 44 includes data related to the Z-axis direction and thus, can be ignored in the drive control in the X-axis direction. The velocity command is input to the velocity control processing part 48. The velocity control processing part 48 produces an electric current command, based on the velocity command that has been input. Based on the electric current command produced by the velocity control processing part 48, the current control processing part 50 outputs a control signal to the servo amplifier 30. The servo amplifier 30 supplies a driving current to the servo motor in response to the control signal. The supplied driving current corresponds to a required angle of rotation of the servo motor. By repeating the above processes, the servo motor is driven until the position command obtained from the machining program 22 and the actual motor position match with each other.

Next, functions of the servo control part 28 in the Z-axis direction will be described. The gap position command calculation part 54 is configured so as to calculate an output value, based on processes that vary depending on stages of the approaching operation of the machining head 12. For example, at the initial stage of the approaching operation, a velocity command is output in order to drive the machining head 12 toward the workpiece 14 at a constant velocity $V_1$ (See FIG. 5.). The approaching operation at the constant velocity $V_1$ continues until the machining head 12 reaches a position close enough to the workpiece 14 such that the machining head 12 can be detected by the gap sensor 20. Once the gap sensor 20 is able to detect an amount of gap between the machining head 12 and the workpiece 14, the gap position command calculation part 54 outputs a velocity command so as to gradually decelerate the velocity for the approaching operation of the machining head 12. The detection signal of the gap sensor 20 is sent to the gap position command calculation part 54 through an A/D converter 59. The velocity command for gradual deceleration is then switched for a gap control. At the stage of the gap control, a velocity for the approaching operation is determined depending on a predetermined (e.g., constant) approach gain and on a distance to the reference gap position detected by the gap sensor 20. The velocity may be determined by, for example, multiplying the approach gain [1/sec (per second)] by the distance to the reference gap position [mm (millimeters)]. If necessary, the velocity may be modified by further multiplying a coefficient. The drive control of the machining head 12 is performed in this way until the amount of gap detected by the gap sensor 20 comes in agreement with the reference gap position.

Next, the gap control part 28 will be described. The gap control part 28 according to the embodiment of the invention includes the above-mentioned gap position command calculation part 54, a position gain calculation part 56 and a position deviation reading part 58. The position gain calculation part 56 calculates a value of a suitable position gain based on an amount of position deviation obtained by the position deviation reading part 58. The amount of position deviation obtained by the position deviation reading part 58 is an amount of position deviation of the servo motor 16 in the Z-axis direction, i.e., a servo delay in the Z-axis direction. The amount of position deviation is obtained by calculating a difference between the position command to the servo motor 16 and the actual position of the servo motor 16 in the Z-axis direction. The position command in the Z-axis direction is calculated by the gap position command calculation part 54. The actual position of the servo motor 16 is detected by the scale 32 attached to the servo motor 16. The position data of the servo motor 16 is fed back as a feedback signal 52 to the servo control part 26, and the amount of position deviation is read by the position deviation reading part 58.

The position gain calculation part 56 calculates a corrected position gain based on the amount of position deviation of the servo motor 16. The calculated corrected position gain is sent to the position control processing part 46. The position control processing part 46 includes a position gain replacing part which functions to switch a most recent position gain into the corrected position gain. In one embodiment, the corrected position gain is calculated based on a theoretical amount of position deviation of the servo motor 16 which is a theoretical value calculated according to a theoretical formula, and on an actual amount of position deviation which is an actual amount of position deviation obtained by the position deviation reading part 58. In one embodiment, a ratio between the theoretical amount of position deviation and the actual amount of position deviation is multiplied by the most recent position gain (i.e., before correction), thereby calculating the corrected position gain.

A method for calculating the corrected position gain in the embodiment will be described with a particular example thereof. The theoretical amount of position deviation of the servo motor 16 is theoretically obtained from the following formula (1):

$$\text{(Amount of Position Deviation)} = \text{(Feed Velocity)}/\text{(Position Gain)} \quad (1)$$

For example, in the case where the feed velocity is 10,000 [mm/min (millimeters per minute)] and the most recent position gain is 50 [1/sec (per second)], then (Amount of Position Deviation)=(Feed Velocity)/(Position Gain)=10,000/(60×50)=3.33 [mm (millimeters)]. The case where the actual amount of position deviation is 5.0 [mm] is now considered. In this case, the ratio between the measured amount of position deviation and the theoretical value thereof is 5.0/3.33=1.50. The most recent position gain (i.e., before correction) is multiplied by the above ratio, so that the corrected position gain is obtained as follows:

$$\text{(Corrected Position Gain)} = 50 \times (5.0/3.33) = 75 \text{ [1/sec]}.$$

The corrected position gain calculated as described above replaces the most recent position gain. In this way, the drive control of the machining head 12 is performed based on an optimum position gain obtained by taking a delay of the servo mechanism into account. Therefore, even if the velocity for the approaching operation of the machining head 12 is large and the servo mechanism tends to delay, the overshoot of the machining head 12 can be prevented. The corrected position gain may be modified by further multiplying the corrected position gain as calculated in the above method by any coefficient (e.g., a preset value).

Figure 2:
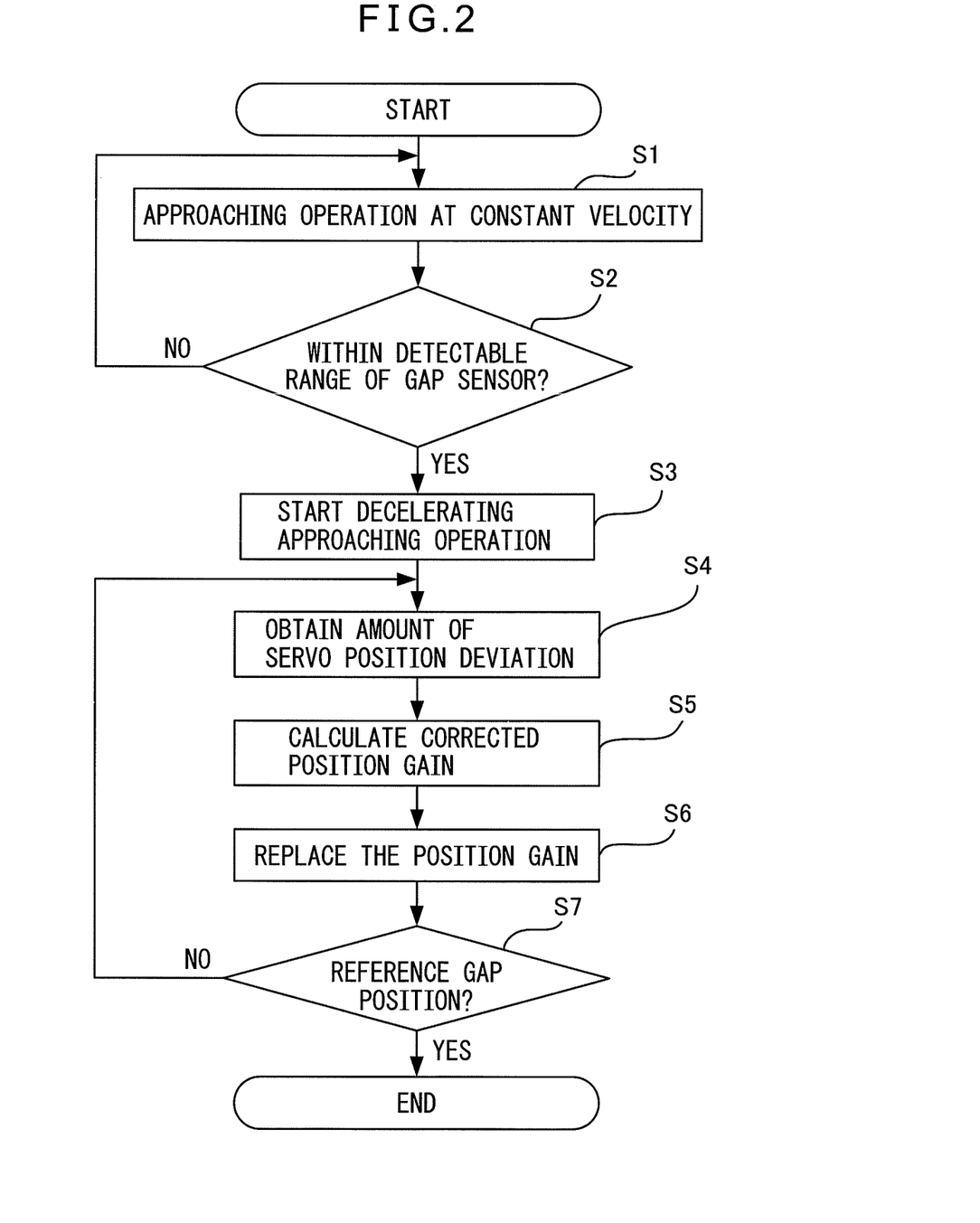
FIG. 2 is a flowchart in order to explain an operation of the controller for laser beam machining according to the embodiment of the invention.

Next, referring to FIG. 2, the steps of a process in the controller for laser beam machining according to the embodiment of the invention will be described. FIG. 2 is a flowchart in order to explain an operation of the controller 10 for laser beam machining according to the embodiment of the invention. It should be noted that the following description is directed to the approaching operation and positioning of the machining head 12 in the Z-axis direction, unless stated otherwise.

First, when the moving amount calculation part 24 produces a moving command, an approaching operation commences by moving the machining head 12 toward the workpiece 14 (step S1). At step S1, the machining head 12 undergoes the approaching operation at a constant velocity. The approaching operation at the constant velocity continues until the gap sensor 20 reaches a position where it can detect a distance between the machining head 12 and the workpiece 14. When the machining head 12 comes close enough to the workpiece 14 to allow the workpiece 14 to be detected by the gap sensor 20 (step S2), the gap position command calculation part 54 produces a velocity command to decelerate the velocity for the approaching operation (step S3). As the velocity for the approaching operation starts decreasing, an amount of servo position deviation is obtained (step S4). A corrected position gain is then calculated from the amount of the servo position deviation according to the above-mentioned method (step S5). The position gain is then replaced, and the position gain at the current time is replaced with a corrected position gain calculated at step S5 (step S6). Next, by means of the gap sensor 20, it is determined whether or not the machining head 12 has reached a reference gap position (step S7). If the result at step S7 is NO, the routine returns to step S4 to repeat the control processes (steps S4 to S6) again in order to adjust the servo delay until the machining head 12 reaches the reference gap position. If the result at step S7 is YES, the approaching operation of the machining head 12 is considered to be finished, and a laser beam machining is then performed. The gap control continues while the laser beam machining is performed, and a distance between the machining head 12 and the surface of the workpiece 14 remains constant in compliance with the reference gap position.

Figure 3:
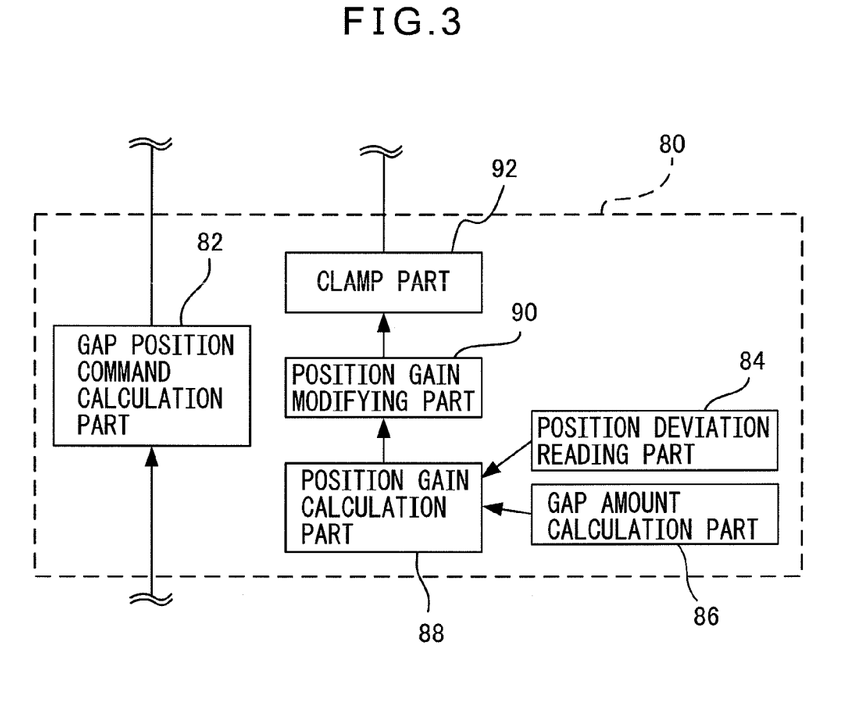
FIG. 3 is a block diagram illustrating a part of a controller for laser beam machining according to a modified embodiment of the invention.
Figure 4:
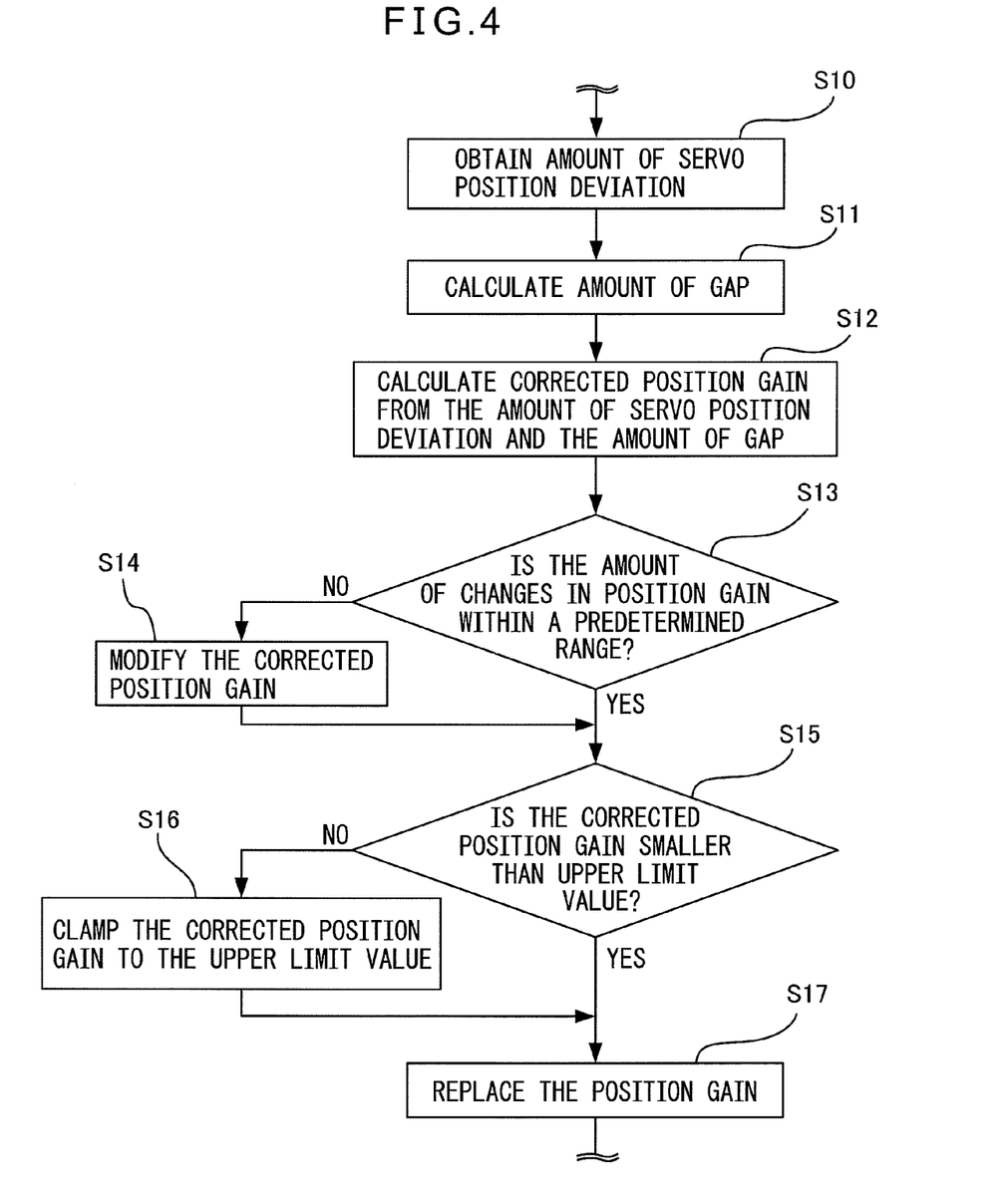
FIG. 4 is a flowchart in order to explain an operation of the part of the controller for laser beam machining according to the modified embodiment of the invention.

Another embodiment of the invention will be described with reference to FIGS. 3 and 4. FIG. 3 is a block diagram illustrating a part of a controller for laser beam machining according to a modified embodiment of the invention, and only shows a gap control part 80 corresponding to the gap control part 28 in the block diagram of FIG. 1. FIG. 4 is a flowchart in order to explain an operation of the part of the controller for laser beam machining according to the modified embodiment of the invention. FIG. 4 illustrates steps S10 to S17 corresponding to the processes of steps S4 to S6 in the flowchart of FIG. 2. In this embodiment, a corrected position gain is calculated by further taking an additional element, i.e., the amount of servo position deviation, into account in the above-mentioned method.

Referring to FIG. 3, the gap control part 80 in this embodiment includes a gap position command calculation part 82, a position deviation reading part 84, a gap amount calculation part 86, a position gain calculation part 88, a position gain modifying part 90 and a clamp part 92. Since functions of the gap position command calculation part 82 is substantially the same as those of the gap position command calculation part 54 in the above-mentioned embodiment, the description thereon will be omitted. The position deviation reading part 84 functions in the same manner as the position deviation reading part 58 in FIG. 1, to obtain an amount of servo position deviation, based on a position command of the servo motor in the Z-axis direction and feed back information of detected positions of the servo motor. The gap amount calculation part 86 calculates a distance from the machining head 12 to the reference gap position based on a value detected by the gap sensor 20 (FIG. 1).

The position gain calculation part 88 calculates a corrected position gain based on the amount of servo position deviation output from the position deviation calculation part 84 and on the amount of gap output from the gap amount calculation part 86. The amount of servo position deviation is used to calculate a ratio thereof in relation to a theoretical amount of position deviation derived from the theoretical formula in a similar manner to the above-mentioned embodiment. On the other hand, the amount of gap calculated by the gap amount calculation part 86 is used to calculate a correction coefficient. In one embodiment, the correction coefficient is used to further multiply the ratio between the theoretical amount of position deviation and the actual amount of position deviation, in order to calculate a corrected position gain. Namely, the corrected position gain is calculated according to the following formula (2):

(Corrected Position Gain)=(Position Gain)×{(Actual Amount of Position Deviation)/(Theoretical Amount of Position Deviation)}×(Correction Coefficient)    (2).

For instance, the correction coefficient may also be a variable that increases or decreases, depending on a distance to the reference gap position. In one embodiment, the correction coefficient can be set so as to gradually decrease as the distance to the reference gap position decreases. The manner how the correction coefficient is set is not limited to any particular manner. For instance, predetermined maximum and minimum values of the correction coefficient are set, and the correction coefficient may be calculated by proportional calculation, depending on a distance to the reference gap position. By modifying the corrected position gain, depending on the distance to the reference gap position as described above, it is possible to perform drive control of the machining head 12 more precisely, depending on stages of the approaching operation. For example, when the machining head 12 has reached a position close enough to the reference gap position which is a target position, it is expected that the velocity command should soon become zero. Therefore, the position gain may then be decreased.

The corrected position gain calculated in this manner is sent to the position gain modifying part 90. The position gain modifying part 90 has a filtering function to prevent the position gain from being abruptly changed. More particularly, the position gain modifying part 90 functions to compare the corrected position gain with the position gain before correction, and to modify the corrected position gain if the amount of changes in the position gain exceeds a predetermined range. For example, if the amount of changes in the position gain exceeds the predetermined range, the corrected position gain is modified such that the amount of changes falls within the predetermined range. The corrected position gain may be modified by simply decreasing it by multiplying a constant coefficient. This prevents the position gain from being abruptly changed and an excessive load from being applied to the servo motor 16 in operation. Therefore, the approaching operation of the machining head 12 becomes more stabile.

The clamp part 92 compares the corrected position gain that has been input thereto with a predetermined upper limit value. If the corrected position gain exceeds the upper limit value, the corrected position gain is clamped to the upper limit value, and the upper limit value, instead of the corrected position gain that has been calculated, is output as the corrected position gain. In this way, the corrected position gain is modified so as not to exceed the upper limit value. Therefore, oscillation of the servo motor 16 due to excessively large position gain becoming too great is prevented.

Although the various methods to modify the corrected position gain have been described above, only any one of the above methods may be applied, or two or more methods may be applied in combination.

Next, referring to FIG. 4, the process of calculating the corrected position gain in the gap control part 80 shown in FIG. 3 will be described. In FIG. 4, the matters that overlap with those already described above with reference to FIG. 2 are not shown. First, the amount of servo position deviation is obtained for use in the calculation of the corrected position gain (step S10). The amount of gap is then calculated by the gap amount calculation part 86, based on the value detected by the gap sensor 20, as described above (step S11). Next, a corrected position gain is calculated according to the above formula (2), based on the amount of servo position deviation and the amount of gap (step S12). Thereafter, the position gain before correction, i.e., the most recent position gain, is compared with the corrected position gain calculated at step S12 in order to determine whether the amount of changes in the position gain before and after the correction falls within the predetermined range (step S13). If the rate of changes of the position gain exceeds the predetermined range, in other words, in the case where the position gain excessively and abruptly changes, the corrected position gain is modified again (step S14). If the amount of changes in the position gain is within the predetermined range, it is determined that modification is not necessary, and the process directly advances to step S15. At step S15, it is determined whether or not the position gain exceeds the upper limit value. If it is determined that the position gain is not greater than the upper limit value, the corrected position gain that has been input is output as is, as the corrected position gain to the position control processing part 46 (FIG. 1). If it is determined that the corrected position gain exceeds the upper limit value, a clamping process is carried out to clamp the corrected position gain to the upper limit value (step S16). In this case, the upper limit value obtained as a result of the clamping process is output as the corrected position gain to the position control processing part 46. In the position control processing part 46, the position gain is replaced with the corrected position gain (step S17), as described above.

Figure 5:
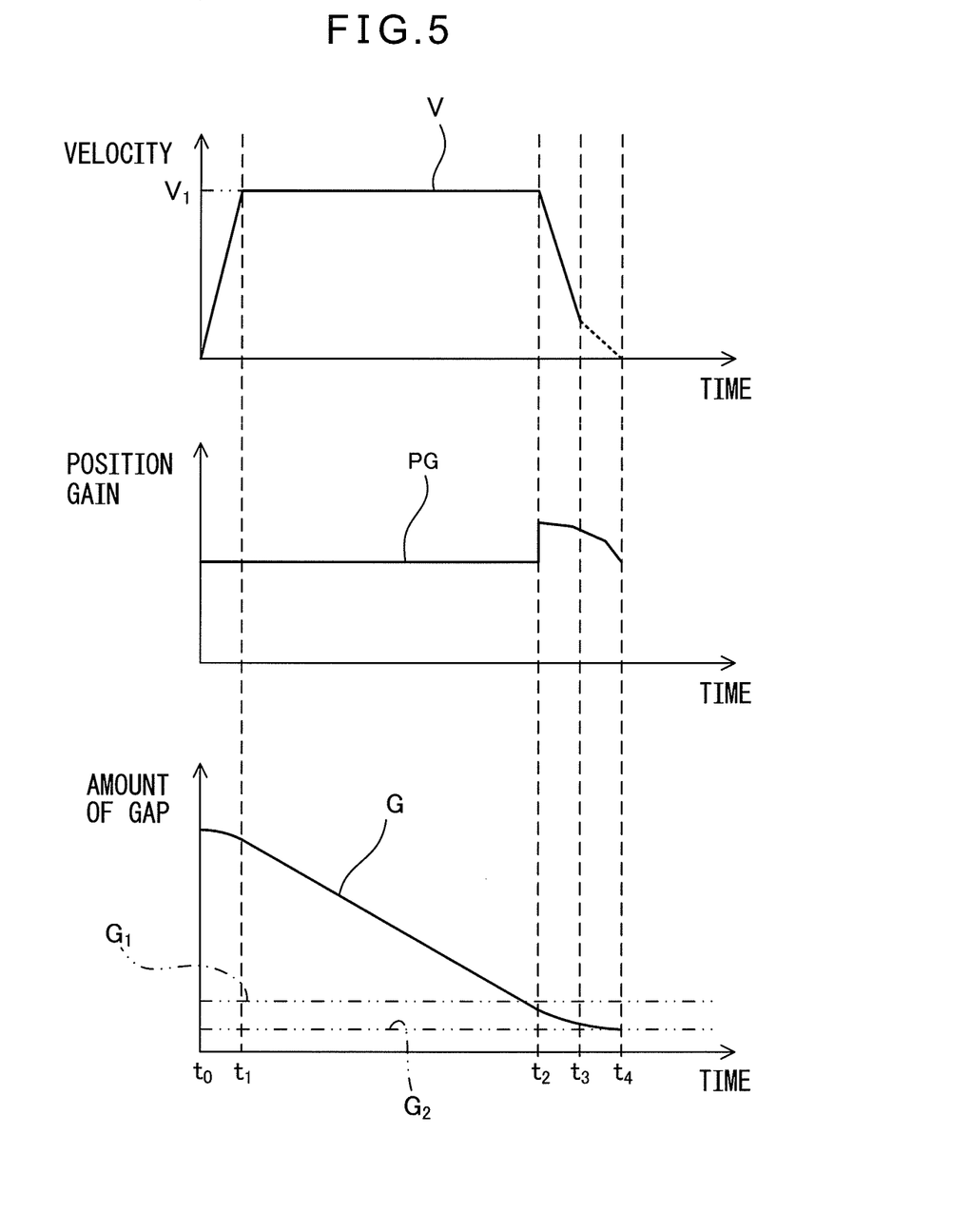
FIG. 5 is a graph showing changes in an approaching velocity of a machining head, in a position gain and in an amount of gap in relation to time when the controller for laser beam machining according to the embodiment of the invention is in use.

FIG. 5 is a graph showing changes in the velocity V of the machining head 12, in the position gain PG and in the amount of gap G in relation to time when the controller for laser beam machining according to the embodiment of the invention is in operation. FIG. 5 shows three graphs arranged vertically next to one another. In these graphs, the horizontal axes represent the passage of time beginning at a time point $t_0$, which corresponds to the time of receipt of the moving command. The vertical axes represent the velocity V, the position gain PG and the amount of gap G, respectively, in the order from the top, and illustrate changes in these values from the start of the approaching operation of the machining head 12 until the machining head 12 reaches the reference gap position.

Of the dashed lines vertically extending over the three graphs, dashed line $t_1$ represents a time point at which the approaching operation at a constant velocity $V_1$ begins. Dashed line $t_2$ represents a time point at which the approaching operation at the constant velocity $V_1$ ends and the machining head 12 starts decelerating with a constant deceleration. In other words, this means that the machining head 12 has approached within such a range that the gap sensor is able to detect an amount of gap between the machining head 12 and the workpiece 14 (in FIG. 5, the amount of gap $G_1$ represents an upper limit of range that can be detected by the gap sensor 20). Dashed line $t_3$ represents a time point at which the velocity control with the constant deceleration is switched to the velocity control by the gap control, which is responsive to the output of the gap sensor 20. Dashed line $t_4$ represents a time point at which the machining head 12 reaches the reference gap position $G_2$.

During a period from time point $t_2$ to time point $t_3$, the velocity V of the machining head 12 is decelerated according to a predetermined constant deceleration output from the gap position command calculation part 54 as described above. During a period from time point $t_3$ to time point $t_4$, the machining head 12 is driven according to the approaching velocity calculated from the distance to the reference gap position $G_2$ which is calculated based on a value detected by the gap sensor 20 and from a predetermined constant approach gain. The approaching velocity is calculated by the gap position command calculation part 54. Time point $t_3$ is a time point at which the velocity decelerating from the velocity $V_1$ at a constant deceleration intersects with the velocity calculated based on the gap control with the constant approach gain.

As shown in FIG. 5, a predetermined value is used as the position gain PG until time point $t_2$ at which the velocity V of the machining head 12 starts decreasing. During a period from time point $t_2$ to time point $t_4$, the correction process is carried out as described above in order to correct the position gain PG, and the thus corrected position gain PG is used.

EFFECTS OF THE INVENTION

According to the first aspect of the invention, the overshoot of the machining head is prevented even if the approaching operation is at high speed and the amount of servo position deviation (servo delay) is great. If the movement of the servo mechanism part is delayed relative to the moving command, the overshoot may occur due to the delay of the servo mechanism part. Namely, even though a velocity command is properly output to change the velocity of the machining head to zero at a time point when the machining head reaches the reference gap position, the machining head might be driven beyond the reference gap position due to the delay of the servo mechanism part. According to the first aspect of the invention, the actual amount of servo position deviation is obtained and the position gain is changed based on the amount of servo position deviation in order to adjust the delay of the servo mechanism part during the approaching operation. Therefore, it is ensured that the machining head is positioned at a suitable reference gap position without the above-mentioned overshoot.

According to the second aspect of the invention, the corrected position gain is calculated by taking account of the amount of servo position deviation that can be theoretically obtained. Therefore, the position gain can be changed such that the actual amount of servo position deviation will become closer to the theoretical amount of servo position deviation. Accordingly, the delay of the servo mechanism part relative to the moving command, which could be the cause of overshoot of the machining head, can be decreased or eliminated during the approaching operation.

According to the third aspect of the invention, the corrected position gain can be modified depending on the distance from the reference gap position which is the target position. Therefore, the approaching operation of the machining head can be more precisely controlled depending on the stages of the approaching operation.

According to the fourth aspect of the invention, the position gain is prevented from being abruptly changed by monitoring the amount of changes in the position gain before and after the replacement of the position gain. Since the abrupt changes in the position gain may result in less stable behavior of the servo mechanism part and therefore of the machining head, it is preferable to avoid the abrupt changes in the position gain. According to the fourth aspect of the invention, the corrected position gain is modified as necessary in order to prevent the above problem.

According to the fifth aspect of the invention, when the position gain is replaced by the position gain replacing part, the position gain after the replacement can be prevented from becoming too great. If the position gain is excessively great, oscillation often occurs, making the operation of the servo mechanism part less stable. According to the fifth aspect of the invention, the corrected position gain is clamped to a predetermined value as necessary, thereby preventing the above problem.

What is claimed is:

1. A controller for laser beam machining for machining an object by irradiating a laser beam thereto from a machining head at a reference gap position situated at a predetermined distance away from the object, the controller comprising:
   a gap sensor for detecting an amount of gap between the machining head and the object;
   a gap position command calculation part for producing a gap position command in cooperation with the gap sensor;
   a servo mechanism part for driving the machining head to the reference gap position based on the gap position command;

a servo position deviation reading part for reading an amount of position deviation of the servo mechanism part;

a position gain calculation part for calculating a corrected position gain of the servo mechanism part, based on the amount of position deviation of the servo mechanism part and based on a theoretical amount of position deviation, the theoretical amount of position deviation corresponding to a ratio of an approaching velocity of the machining head to the position gain; and a position gain replacing part for replacing the position gain of the servo mechanism part with the corrected position gain calculated by the position gain calculating part, wherein the corrected position gain takes servo delay into account and thereby prevents overshoot of the gap between the machining head and the object.

2. The controller for laser beam machining according to claim 1, wherein the position gain calculation part calculates a modified value of the corrected position gain by modifying the corrected position gain based on the amount of gap detected by the gap sensor.

3. The controller for laser beam machining according to claim 1, further comprising a position gain modifying part for modifying the corrected position gain based on an amount of changes in the position gain upon replacement by the position gain replacing part.

4. The controller for laser beam machining according to claim 1, further comprising a clamp part for clamping the corrected position gain to a predetermined value if the corrected position gain exceeds the predetermined value in comparison of the corrected position gain with the predetermined value.

* * * * *